J. E. EATON.
AIRPLANE.
APPLICATION FILED NOV. 13, 1919.
1,340,707.
Patented May 18, 1920.
2 SHEETS—SHEET 1.
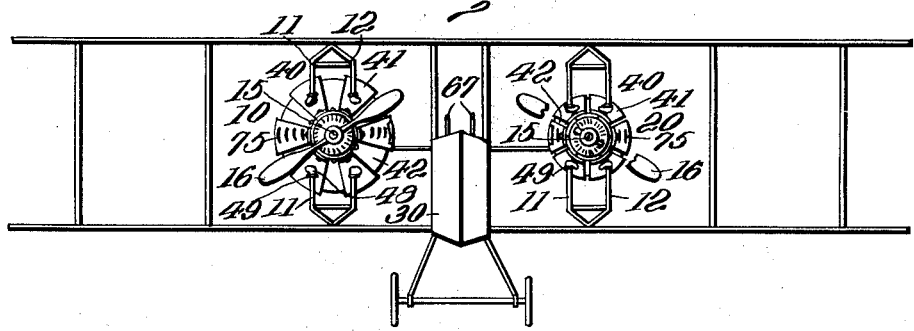
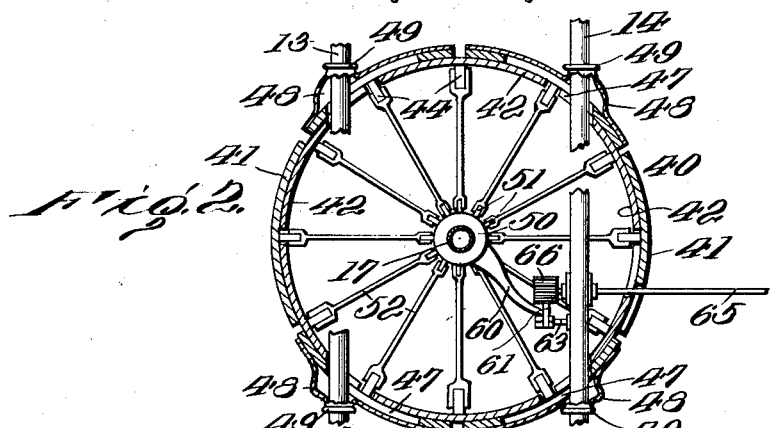
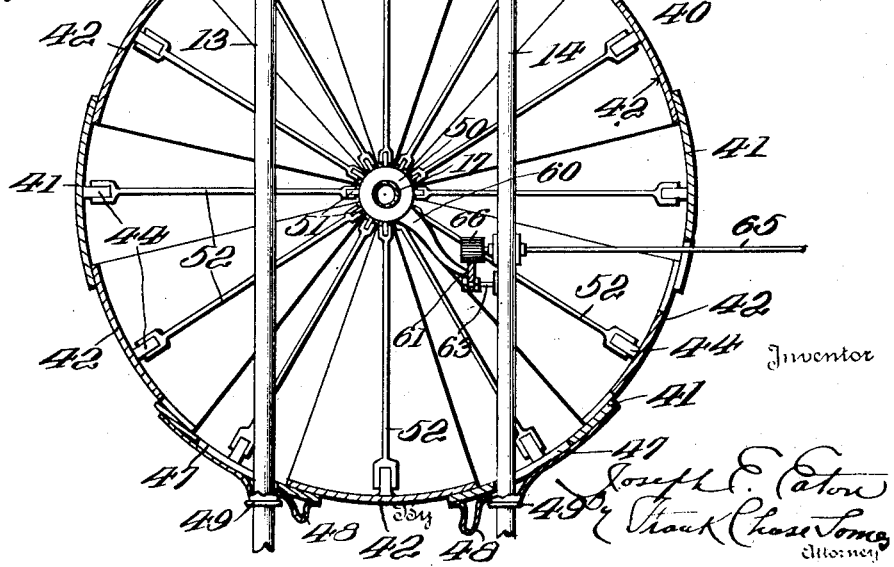

J. E. EATON.
AIRPLANE.
APPLICATION FILED NOV. 13, 1919.

1,340,707. Patented May 18, 1920.
2 SHEETS—SHEET 2.

UNITED STATES PATENT OFFICE.

JOSEPH E. EATON, OF SAN FRANCISCO, CALIFORNIA.

AIRPLANE.

1,340,707.   Specification of Letters Patent.   Patented May 18, 1920.

Application filed November 13, 1919. Serial No. 337,758.

*To all whom it may concern:*

Be it known that I, JOSEPH E. EATON, a citizen of the United States of America, and a resident of the city of San Francisco, in the county of Alameda, in the State of California, have invented certain new and useful Improvements in Airplanes, whereof the following is a specification.

This invention relates to airplanes having a plurality of engines and is especially adapted to large airplanes for commercial and passenger service.

The object of the invention is to provide an airplane of a construction which will render it practicable to make engine repairs during flight, thus avoiding the delays incident to landings for this purpose.

Probably the greatest drawback to modern flying is that engines are unreliable to the extent of suddenly developing some trouble that necessitates a landing of the airplane for repairs. In multi-engined airplanes of two or more engines, it is sometimes possible to fly with one or more engines while another or others are out of order, as flying with two while a third is not running. If the stalled engine could then be repaired during flight a great advantage would result. To repair while flying has heretofore been impracticable, subjecting as it would, the mechanician to the danger of being blown off the machine under the terrific wind of around one hundred miles an hour induced by the flight through the air, and rendering it impossible for proper work to be done under such condition.

Wind shields placed in front of the engines are impracticable because such shelters or wind breaks to be effective would have to be so large as to create an enormous resistance and seriously handicap the airplane in its progress through the air. It is so necessary to cut down as far as possible head resistance in order that the plane may slip forward easily and speedily through the air, the machines are constructed with "streamlined" parts, that is, built in cigar shape or like a torpedo, so that the air slips easily and with little resistance around them. Even wires are often made flat and wings built in thin smooth shapes.

The invention comprises an expansive contractive windcab for the engine adapted in contracted position to hug the engine and avoid resistance and in expanded position to form a cab, wherein the mechanician can make the necessary repairs to the engine under protection from the dangerous winds which would otherwise prevent or interfere with his work. The windcab is streamlined in both positions. The device is also useful to enable the operator to inspect and regulate the engine without dangerous exposure.

It is believed that the solving of this problem of providing an airplane which admits of engine repairs during flight without involving a resistance which will substantially impede the flight, will go a long way toward the successful commercial use of larger airplanes, as the ability to repair engines in the air successfully, will make the plane much more safe and reliable.

In the accompanying drawings, Figure 1 represents a front elevation of an airplane embodying the preferred form of this invention, showing the engines provided with expansive and contractive windcabs or inclosures for protecting the workman during repair work, the windcab at the left of said figures being expanded into streamline operative position and that at the right being collapsed into streamline inoperative position.

Fig. 2 represents a transverse section of the windcab in collapsed position.

Fig. 3 represents a transverse section thereof in expanded position.

Fig. 4 represents a side elevation of an airplane engine provided with a workman's windcab in expanded position, parts being broken out to facilitate illustration.

Fig. 5 represents a perspective view of parts of the airplane frame structure, the workman's platform connected therewith and parts of the mechanism for expanding and collapsing the workman's windcab.

The same reference numbers indicate corresponding parts in the different figures.

This invention may be embodied in any multi-engined airplane. In the illustrative embodiment a biplane is shown in which two engines 10 and 20 are disposed at opposite sides of the cockpit or fuselage 30 and secured by any usual or suitable means to the struts 11, 12, 13 and 14 which are mounted in the frame of the airplane and serve as a support for said engine. The engine has a driving shaft 15 which carries and drives the propeller 16. An elongated rod or tube 17 extends rearward from the engine substantially in line with the driving shaft thereof, being screwed into the engine crank case or in a plate bolted to said case, or otherwise.

An expansible contractible windcab 40 is provided for each engine. This windcab is preferably egg-shaped or approximately so and is independent of and spaced from the body of the car or aviator cab or fuselage. As shown it has a truncated front end and a tapered or pointed rear end. The windcab is constructed of laterally overlapping staves or plates laterally slidable on one another to expand or contract the structure. It is preferably composed of two circular concentric series of flexible staves, an outer series 41 and an inner series 42. The staves of both series are alike or similar. The staves of the outer series 41 are spaced apart from one another and the staves of the inner series 42 are spaced apart from one another, those of the outer series overlapping the edges of the adjacent staves of the inner series and closing the spaces between them, and those of the inner series underlapping the adjacent edges of the staves of the outer series and closing the spaces between them. The staves are preferably arc-shaped in cross section and those of one series fit and slide laterally in contact with those of the other series. The staves are secured at their front ends to the front of the engines by bolts 43 and are provided along the central portion of the structure on their inner faces with longitudinal ribs 44 having eyes 45. The staves are preferably straight along said central portion, curved or inclined somewhat abruptly to the front and inclined or curved more gradually in their longer extensions rearward. They are tapered in width in both directions from said central portion and provided in their rear extensions with longitudinal slots 46.

The engineer windcab is provided with slots or openings 47 to permit the struts of the frame to pass therethrough. These openings are covered by flexible gaskets 48 which may be constructed of rubber, rubberized cloth or other suitable material, which will give in the direction of the struts as the cab is expanded or contracted. The gaskets are provided with rings 49 which fit the struts and slide up and down thereon during such contraction and expansion. The gasket is made large and somewhat puckered to permit the movement of the staves with relation to the struts. These gaskets serve to prevent an undue entrance of air into the cab or through these joints.

The engineer windcab is provided with suitable means for effecting the expansion and contraction thereof at the will of the aviator from his position in the aviator cab or fuselage. The means shown for this purpose are similar in part to the means used in opening and closing an umbrella. A slide preferably in the form of sliding collar 50 is disposed on the tube 17 which serves as a longitudinal guideway, and provided with a series of radial ears 51. This guideway may be in the form of a rod or a tube and in the latter case may serve as the engine exhaust. Rods or links 52 connect the staves with the sliding collar 50, the front ends of the rods being bolted to the ribs 44 of the staves and their rear ends to the ears 51 of said collar. An arm 60 depending from the sliding collar 50 is connected at its outer end with a sliding rack bar 61. This bar is provided with a slot 62 which is engaged by a stud 63 secured to the strut 14, and has teeth 64 forming the rack. A crank shaft 65 is supported in bearings secured to said strut above said stud. This crank shaft has a pinion 66 at its inner end which engages said rack. The crank shaft extends to a point within the cockpit and is there provided with a crank 67 whereby the aviator may readily operate said mechanism for expanding or collapsing the cab.

The expansion of the staves diametrically to form the cab necessarily involves an endwise contraction thereof and a collapsing of the cab likewise requires a longitudinal extension thereof. Means are therefore provided for holding in relative position during such expansion and contraction the rearward extensions of the staves. The means shown for this purpose comprise a hub 70 extending radially therefrom and a circular band or rim 72 fixed on said radial arms at the outer ends thereof. The band 72 encircles the circular series of staves around the rear portion thereof and the rods 71 pass through the slots 46 in said staves and hold them constantly in their proper relative positions, and permit their ends to slide longitudinally as required in the expansion and contraction of the cab.

The cab is provided with a door opening 73 and a door 74, shown in the form of a sliding door, permits the entrance and exit of the mechanician. A workman's platform 80 is secured to the uprights within the cab.

The windcab is expanded for repairs or regulation of the engine, preferably while the latter is running slowly or stopped altogether, and is contracted in normal flight to reduce resistance to progress. All parts of the device are preferably made of metal; aluminum being used where possible on account of its lighter weight, and steel in those parts where rigidity or greater strength is required.

The cab is provided with ventilating slits 75 for the admission of air to the cab and these slits may be provided with registers 76 for regulating such admission.

The windcab serves not only as a windshield and container for the workman, but more or less as a regulator for the heat and air pressure for the carbureter, when located upon the engine within said cab.

The drawings illustrate one embodiment of this invention but various forms of embodiment may be adopted without departure from the scope or spirit of the invention as set forth in the claims.

I claim as my invention:

1. An airplane having independent of the aviator cab an expansible and collapsible casing surrounding an engine and adapted to form in expanded position means for protecting a workman from the wind of flying.

2. An airplane having a protective casing comprising a circular series of overlapping staves adjustable laterally to expand or contract the casing, and means for effecting such expansion and contraction.

3. An airplane engine covering closely inclosing the engine and comprising laterally expansible members adapted to form in expanded position an inclosure for the engineer.

4. An airplane engine covering closely inclosing the engine and comprising laterally expansible flexible members adapted to form in expanded position an inclosure for the engineer.

5. An airplane engine streamline covering closely inclosing the engine and comprising laterally expansible members adapted to form in expanded position an inclosure for the engineer.

6. An airplane engine covering closely inclosing the engine and comprising laterally expansible members adapted to form in expanded position an inclosure for the engineer, said covering being streamlined in both expanded and contracted form.

7. An airplane having an engine, supported in the frame thereof, an expansive contractive workman's cab provided with openings through which struts of said frame pass, and means for expanding said cab to form a workman's inclosure to facilitate inspection, regulation and repair of the engine and contracting it into a substantially streamlined covering of said engine.

8. An airplane having an engine supported in the frame thereof, an expansive contractive workman's cab provided with openings through which struts of said frame pass, means adapted to expand said cab to form a workman's wind protected inclosure to facilitate inspection, regulation and repair of the engine and to contract it into a substantially streamlined covering of said engine, and flexible gaskets which close said openings around said struts and permit the expansion and contraction of said cab thereon.

9. An expansive contractive workman's cab substantially inclosing an airplane engine and comprising two circular concentric series of flexible staves, the staves of each series being spaced apart and those of one series covering the spaces between those of the other series and overlapping or underlapping at the edges thereof, and means for expanding and collapsing said cab.

10. An airplane engine having an inclosing series of overlapping staves converged toward their rear ends and provided with slots in their rearward extensions, a guideway extending rearward from said engine, a slide on said guideway, links connecting said slide with said staves, means for shifting said slide on said guideway to expand or contract said staves, and a fixed lateral guide device engaging the slots of said staves.

11. An airplane engine having an inclosing series of overlapping staves converged toward their rear ends and provided with slots in their rearward extensions, a guideway extending rearward from said engine, a slide on said guideway, links connecting said slide with said staves, means for shifting said slide on said guideway to expand or contract said staves, a fixed lateral guide device engaging the slots of said staves, a sliding rack bar connected with said slide, and a crank shaft provided with a pinion engaging said rack bar, said shaft extending into the cockpit and being there provided with an actuating crank.

12. An airplane engine having an inclosing series of overlapping staves converged toward their rear ends and provided with slots in their rearward extensions, a rod extending rearward from said engine, a sliding collar on said rod, links connecting said collar with said staves, and means for shifting said collar on said rod to expand or contract said staves.

13. An airplane engine having an inclosing circular series of overlapping staves converged toward their rear ends and provided with slots in their rearward extensions, a rod extending rearward from said engine, a sliding collar on said rod, links connecting said collar with said staves, means for shifting said collar on said rod to expand or contract said staves, and a guide device fixed on said rod and engaging the slots of said staves.

14. An airplane engine having an inclosing series of overlapping staves converged toward the rear ends and provided with slots in their rearward extensions, a rod extending rearward from said engine, a sliding collar on said rod, links connecting said collar with said staves, means for shifting said collar on said rod to expand or contract said staves, a sliding rack bar connected on said collar, and a crank shaft provided with a pinion engaging said rack, said shaft extending into the cockpit and being there provided with an actuating crank.

15. An expansive contractive workman's cab, substantially inclosing an airplane engine and comprising a circular series of flexible staves and means for bending said staves to expand and contract said cab laterally.

16. An airplane engine provided with means for facilitating inspection, regulation and repair thereof during flight, said means comprising an expansible collapsible inclosing casing adapted to form a workman's windcab in expanded position and a streamlined covering closely inclosing the engine in contracted position, and means for expanding and contracting said casing.

17. An airplane engine provided with means for facilitating inspection, regulation and repair thereof during flight, said means comprising an expansible collapsible inclosing casing provided with ventilating means and adapted to form a workman's windcab in expanded position and a streamlined covering in contracted position, and means for expanding and contracting said casing.

18. An airplane engine provided with means for facilitating inspection, regulation and repair thereof during flight, said means comprising an expansible collapsible inclosing casing adapted to form a workman's windcab in expanded position and a streamlined covering in contracted position, a workman's platform within said casing, and means for expanding and contracting said casing.

19. An airplane engine having a rearwardly extended exhaust tube, a slide on said exhaust tube, an expansive contractive casing surrounding said engine and comprising a circular series of overlapping converged staves, links connecting said staves with said slide, and means for shifting said slide to expand or contract said casing.

20. An airplane comprising an aviator cab, a plane driving motor disposed outside said aviator cab, an expansible and collapsible casing surrounding said motor and adapted to form in expanded position a workman cab adapted to afford protection against the wind of flying, and means operative from the aviator cab for expanding and contracting said casing.

21. An airplane comprising an aviator cab, plane driving motors spaced from said aviator cab on opposite sides thereof, expansible and collapsible casing for the respective motors adapted to form in expanded position means for protecting a workman from the wind of flying, and means operative from said aviator cab for expanding and contracting said casings respectively.

22. An airplane comprising an aviator cab, a plane driving motor disposed outside said aviator cab, an expansible and collapsible casing for said motor adapted to form in expanded position a means for protecting a workman against the wind of flying, and means operative from the aviator cab for expanding and contracting said casing.

JOSEPH E. EATON.

Witnesses:
R. A. LOGAN,
F. B. EATON.